(12) United States Patent
Eldredge et al.

(10) Patent No.: US 6,718,526 B1
(45) Date of Patent: Apr. 6, 2004

(54) SPATIAL SIGNATURE ANALYSIS

(75) Inventors: Peter Eldredge, Scotts Valley, CA (US); Patrick Y. Huet, San Jose, CA (US); Robinson Piramuthu, San Jose, CA (US); Sandeep Bhagwat, Milpitas, CA (US); Kai Chi, San Jose, CA (US); Kai Liu, Santa Clara, CA (US); Martin Plihal, Pleasanton, CA (US); Shaio Roan, Cupertino, CA (US); Maruti Shanbhag, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 10/360,433

(22) Filed: Feb. 7, 2003

(51) Int. Cl.⁷ .............................................. G06F 17/50
(52) U.S. Cl. ................................................ 716/4; 716/5
(58) Field of Search ..................... 716/1, 4, 5

(56) References Cited

U.S. PATENT DOCUMENTS

| | | | | |
|---|---|---|---|---|
| 5,991,699 A | * | 11/1999 | Kulkarni et al. | 702/83 |
| 2002/0046386 A1 | * | 4/2002 | Skoll et al. | 716/1 |
| 2003/0196180 A1 | * | 10/2003 | Li et al. | 716/4 |

* cited by examiner

*Primary Examiner*—Stacy A. Whitmore
(74) *Attorney, Agent, or Firm*—Luedeka, Neely & Graham, P.C.

(57) ABSTRACT

A system for determining an assigned classification for a set of physical events on a substrate. Sensors sense the physical events on the substrate and produce event data. A plug in rule module manager receives and manages any number of plug in rule modules. Each plug in rule module has an input, a local filter, an analyzer, and an output. The input receives the event data and confidence values from preceding plug in rule modules. The local filter analyzes the received confidence values from the preceding plug in rule modules and selectively by passes the plug in rule module based at least in part upon the received confidence values from the preceding plug in rule modules. The analyzer analyzes the event data in view of a given classification associated with the plug in rule module, and assigns a confidence value based at least in part upon how well the event data fits the given classification. The output provides the confidence value to subsequent plug in rule modules. A post processor receives the confidence values provided by the plug in rule modules, and makes a final selection of the assigned classification to be associated with the set of physical events from the given classifications based at least in part upon a comparison of the confidence values produced by all plug in rule modules.

20 Claims, 4 Drawing Sheets

SPATIAL SIGNATURE ANALYSIS

FIELD

This invention relates to the field of computer based analysis of data. More particularly, this invention relates to extensible and upgradeable software analysis Structures.

BACKGROUND

Most monolithic integrated circuits are fabricated as batches of devices on a common substrate, typically referred to as a wafer. By having many such devices on a single wafer, the devices are easier to handle and fabrication costs can be reduced. Because the functional elements within each of the devices tend to be extremely small, they can be easily damaged. For example, particulate matter can be extremely detrimental to a device, regardless of whether that particulate matter is air borne or liquid borne. Any particles landing on the surface of the wafer, if they are not removed in a timely manner, may interfere with the fabrication process and cause the device to fail. In a similar fashion, scratches and other physical interferences with the desired fabrication process may also cause the devices to fail.

Because it is so important that the causes of such physical anomalies, generally referred to as defects herein, be identified and corrected as soon as possible, wafers are typically given a physical inspection at various stages of the fabrication cycle. Inspectors try to determine not only the type of defect, whether it be for example scratches or particulate matter, but also the source of the defect. In many cases the type of defect and the pattern of the defect can provide clues as to the source of the defect. Typically, such inspections have been done manually by a trained technician or engineer who studies one or more of the wafers under a microscope of some kind, searching for defects and trying to determine their origin from any clues that his experience may have taught him.

Manual inspection of each wafer is cumbersome and the results may be inaccurate and inconsistent due to factors such as fatigue, inexperience, or carelessness. Spatial signature analysis provides the ability to automatically track problems in an integrated circuit wafer process. Spatial signature analysis can be performed on wafers at different stages of the fabrication process to detect certain patterns of defects on them. Identified patterns can be mapped to a different process that the wafer underwent. For example, a defective chemical mechanical planarization process may cause long curved scratches. Thus process problems can be quickly detected automatically, without resorting to the scrutiny of a subset of the microscopic defects, which typically requires a scanning electron microscope review station. This in turn leads to quicker corrective actions, improving the yield and increasing the profit.

Unfortunately, spatial signature analysis has heretofore been a very inflexible process, and often tends to miss the forest for the trees. In other words, such automated routines have a tendency to over analyze defects individually, and do so repeatedly, without recognizing the patterns of defects that may be present. Thus, spatial signature analysis typically has a problem determining the nature of defects, tends to take too long to be used with modem equipment, and is not expandable or reconfigurable past its originally implemented capabilities and parameters. Additionally, there is no provision for users to selectively employ multiple versions of software modules within such a system, or maintain a baseline when upgrading or otherwise moving between different software modules.

What is needed, therefore, is a spatial signature analysis system that overcomes problems such as these.

SUMMARY

The above and other needs are met by a system for determining an assigned classification for a set of physical events on a substrate. Sensors sense the physical events on the substrate and produce event data. A plug in rule module manager receives and manages any number of plug in rule modules. Each plug in rule module has an input, a local filter, an analyzer, and an output. The input receives the event data and confidence values from preceding plug in rule modules. The local filter analyzes the received confidence values from the preceding plug in rule modules and selectively by passes the plug in rule module based at least in part upon the received confidence values from the preceding plug in rule modules. The analyzer analyzes the event data in view of a given classification associated with the plug in rule module, and assigns a confidence value based at least in part upon how well the event data fits the given classification. The output provides the confidence value to subsequent plug in rule modules. A post processor receives the confidence values provided by the plug in rule modules, and makes a final selection of the assigned classification to be associated with the set of physical events from the given classifications based at least in part upon a comparison of the confidence values produced by all plug in rule modules.

In this manner, as many plug in rule modules as desired may be used. However, an increasing number of plug in rule modules does not necessarily produce a commensurate increase in processing time, because the local filter for a given plug in rule module can be set to selectively by pass the given plug in rule module if a confidence value assigned by a preceding plug in rule module is high enough. Thus, processing time is not wasted by processing subsequent plug in rule modules when a sufficiently high confidence has been achieved with a preceding classification. On the other hand, because all confidences assigned by the various plug in rule modules are arbitrated by a post processor, the system does not merely select the first classification that is associated with a relatively high confidence value. Thus, both an increase in general accuracy of the classification process, and a general decrease in the processing time are achieved.

In various preferred embodiments, the input of the plug in rule module is further adapted for receiving a user specified weight value, where the weight value selectively increases and decreases the confidence value produced by the plug in rule module. The input of the plug in rule module may also be adapted for receiving a user specified contrast value, where the contrast value selectively increases and decreases a resolution of the event data from other data collected from the substrate. In addition, the input of the plug in rule module may be adapted for receiving a user specified interference value, where the interference value selectively increases and decreases a grouping of the event data.

The system preferably includes a common data storage for receiving the event data and for providing the event data to the at least one plug in rule module. A compatibility module preferably manages multiple versions of a given plug in rule module within the system. In a first embodiment, the compatibility module has a user selectable setting for always using a reference version of the given plug in rule module. In a second embodiment, the compatibility module has a user selectable setting for always using a newest version of the given plug in rule module, and for adapting output from the newest version of the given plug in rule module to have a same baseline with respect to a reference version of the given plug in rule module. In a third embodiment, the compatibility module has a user selectable setting for always using a newest version of the given plug in rule module, regardless of whether output from the newest version of the given plug in rule module has a same baseline as a reference version of the given plug in rule module.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Spatial signature analysis as disclosed herein provides the ability to automatically track problems in a wafer process. It involves classification of groups of events on a wafer. An event is a measurable physical characteristic on the surface of a wafer, such as a point defect whose location is known. The described system is a flexible and extendible approach to ruled based spatial signature analysis. Each rule is in the form of a plug in component. Thus, given the spatial signature analysis framework described herein, new plug ins may be released for use as they become available. This spatial signature analysis framework is also extendible to use feature based spatial signature analysis rules, as described in more detail below.

The new spatial signature analysis described herein follows a Bayesian approach to assign a confidence value to each classified event and uses soft decision to perform local filtering at the rule level based on the Bayesian confidence. Local filtering by the plug in rules reduces the probability of inaccurate classification and increases the probability of accurate classification. In addition, the local screening of previously assigned confidence values by subsequent rules tends to improve classification speeds, as some or all subsequent rules may be skipped, based on the previously assigned confidence values. Classifications based on different plug in rules are finally arbitrated by a post processor, which uses Bayesian confidence to determine the final signature and class identification. Parameters of plug ins are also preferably grouped into three categories, as described below. Common parameters for plug ins are preferably intuitive for the user to understand.

The present system is rule based and not feature based because feature based approaches tend to be handicapped by dimensionality and the peaking phenomenon. In addition, feature based systems require a classifier that typically consumes a lot of user time to prepare. However, rules can be easily customized for a particular process. Segmentation is tailored to the rules, unlike in feature based approaches. Further, improved speeds can be achieved since unnecessary spatial signature analysis features are not calculated, and segmentation algorithms are cheaper since they are not generic. However, the new spatial signature analysis framework described herein is extensible enough to allow plug in rules that are feature based, if so desired.

As used herein, the term signature is not the same as a cluster. A cluster can be a signature, whereas a signature need not be a cluster. Events in a cluster are grouped together based on their proximity. Events in a signature may not be proximal neighbors at all. It is more difficult to train a feature based classifier to recognize signatures than it is to train it to recognize clusters. Thus, the system described herein, being rule based, is better adapted at recognizing the defect signatures present on a wafer.

Another benefit of having user selectable plug in rules, is that newer versions of the rules can be plugged in as desired. In addition, several versions of the same rule can be maintained and selectively deployed by the user. Preferably, the system described herein provides the ability to adjust a baseline of a given version of a rule to match that of a prior or subsequent version of a rule. In this manner, a user can select between different versions of a plug in module as desired, and either maintain a given baseline or use the different baseline provided by the different plug in rule module version.

System Architecture

Figure 6:
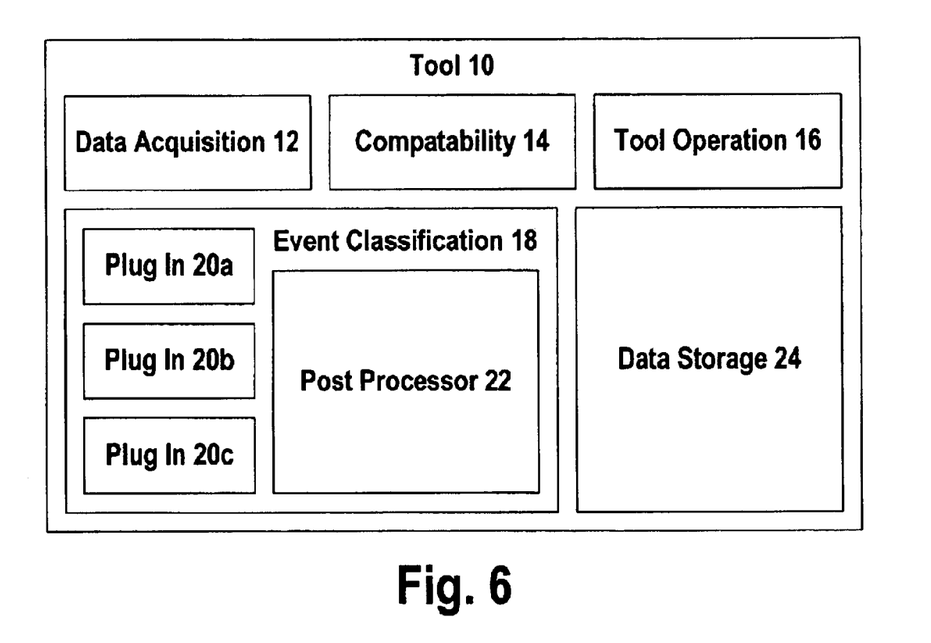
FIG. 6 is functional representation of a tool incorporating the system described herein.

The system described herein preferably resides within a tool 10, as functionally represented in FIG. 6. The tool 10 is preferably one such as is configurable to determine physical defects like scratches and particulate matter on a wafer. The tool 10 preferably has specialized hardware components, represented as data acquisition module 12, such as sensors for detecting the physical defects. Also included in the data acquisition module 12 data input circuits for transferring data from the sensors to the other portions of the tool 10. As described in more detail hereafter, the data is most preferably stored in a common data storage 24, which is available to the other components of the tool 10 in a manner that multiple redundant copies of the data do not need to be made.

Other portions of the tool 10 are preferably configured as a programmable computer system, the programming for which can be changed as desired. Portions of the programming are preferably stored in relatively more permanent memory, and other portions of the programming are preferably stored in relatively more rewritable memory. For example, the tool operation software 16 is preferably stored in a relatively more permanent memory. The tool operation software 16 preferably controls the operation of the sensors and the other hardware aspects of the tool 10.

The tool 10 includes an event classification module 18, which analyzes the data stored in the data storage 24, so as to classify the events represented by the data. Within the event classification module 18 are various plug in modules such as 20a, 20b, and 20c, which are described in more detail elsewhere herein. It is appreciated that either a greater or lesser number of plug in modules 20 may be used, and the FIG. 6 is representational of functions only. Also included in the event classification module 18 is a post processor 22, which is the final arbiter of the various preliminary assessments submitted by the various plug in modules 20, and which provides a final classification for the various events represented by the data. A compatibility module 14 provides the ability to have multiple versions of a single plug in module 20a, 20b, or 20c installed in the tool 10, while selectively maintaining a common historical baseline between the different versions of the same plug in module, as describe in more detail below.

Figure 7:
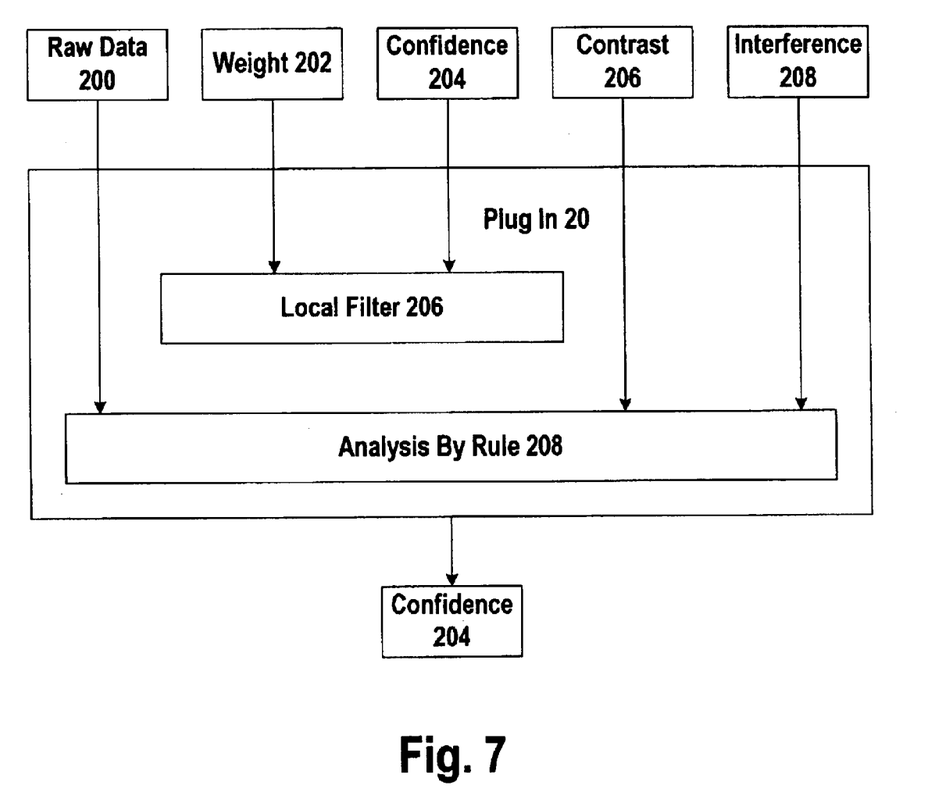
FIG. 7 is a functional representation of a plug in rule module as described herein.

The plug in rules 20 receive certain data and provide certain output, as functionally depicted in FIG. 7. A brief overview of the operation of the plug in 20 is provided at this point, with more detailed descriptions of the various operations, inputs, and outputs described hereafter. Included in the input for the plug in 20 is the raw data 200, which represents the data from the sensors of the data acquisition module 12, as depicted in FIG. 6. As described in more detail hereafter, the raw data 200 is most preferably accessed from the common data storage 24. The plug,in 20 also receives a weight value 202, which is most preferably user definable. The plug in 20 receives confidence values 204, which are produced by previously implemented plug ins 20. The weight 202 and the confidence 204 are received by a local filter 206 in the plug in 20, which decides whether the plug in 20 will analyze the raw data 200 or not. If an analysis is called for, then the raw data 200 is analyzed such as by the module 208, in light of a user provided contrast value 206 and a user provide interference value 208. Finally, a confidence value 204 is output, in which the confidence for this particular plug in 20 is added to the confidence values 204 which have been provided by the prior plug ins 20.

There are several new ideas introduced by the current rule based approach. These ideas are described in more detail below, and include a flexible framework, plug in rules, dynamic confidence levels, assignable weights, local filtering, post processing, common parameter categories, common clustering parameters, the ability to have a feature based plug in, and baseline shift control between version of a plug in.

Flexible Framework

With reference now to FIGS. 6 and 7, the present system has a single spatial signature analysis framework in which multiple rules 20 can be plugged in. The new spatial signature analysis framework has a common data repository (data manager) 24 that is used by any number of plug ins 20, which are invoked by an execution scheme (algorithm manager) 18. The selection and sequence of execution of the various plug ins 20 used is configurable by the user. The selection and sequence of execution of the plug ins 20, along with the parameters for each plug 20 in selected, is called a recipe. Efficient data transfer and data storage without redundant copies of data are achieved through use of shared memory 24 by the various plug in rules 20.

This structure provides for easier and faster deployment of new rules 20 to customers who already have the spatial signature analysis framework. It also provides for a faster analysis than existing ruled based systems because data transfer is through a common framework that uses a shared memory 24. Redundant copies of data are avoided across different plug in components 20. The system software preferably uses an object oriented component object model which tends to be much easier to maintain than a monolithic application consisting of libraries.

Plug In Rules

Each rule 20 preferably represents a pattern of interest, such as an annular ring pattern, arcing patterns, or parallel line patterns. It is preferably in the form of a component object model, as mentioned above. Each category of pattern is called a class. Each instance of this class is a signature. The number of plug ins 20 can be as many as possible, each specializing in detecting signatures of a particular class. Each plug in 20 is directly independent of each other.

Such a system promotes accuracy of defect identification. Most pattern recognition algorithms have a segmentation step that typically depends on the pattern of interest. Use of separate plug in rules allows segmentation tailored to the class of interest. This is not possible in feature based systems. Further, since each plug in 20 is isolated from other plug ins 20, it is much easier to fix bugs in the present system than in a monolithic application consisting of libraries. In addition, users can pick which rules 20 to use for classification. This reduces or eliminates unnecessary spatial signature analysis rules 20 and improves speed. For example, if the user does not care about processes that cause scratches, then the corresponding plug in rule 20 may not used. This may also reduce inaccurate classifications that unnecessary spatial signature analysis rules 20 may produce.

Dynamic Confidence Levels

Each plug in rule 20 assigns two different Bayesian confidence levels 204 to each event, namely (i) signature based weights and (ii) event based weights. Signature based weight is the confidence on the membership of a detected signature to the class that it was classified. Event based weight is the confidence on the membership of an event to the signature that it is part of. Each plug in component 20 calculates the signature based weights and event based weights specific to the rule it applies for detection. Thus the weights are more reliable estimates of Bayesian confidences than those produced by other systems.

Assigned Weights

The user has the ability to select which classes are more important than others to detect. For example, a user may wish to give more importance to a ring than to a scratch, because the presence of a ring may mean more damage to the wafer. These weights 202 are also called class based weights. In practice, signature based weights and event based weights 204 are sufficient, since they are dynamically calculated. The effective confidence of classification of an event can be obtained from class, signature, and event based weights using Bayesian rules. Thus, the user has the ability to select which classes are more important to detect.

Local Filtering

Each plug in rule 20 has a local filter 206, which can perform either (i) hard subtraction (ii) hard inclusion or (iii) soft subtraction of events entering it. This determines which events are considered for the current rule 20. Use of this filter 206 not only reduces and preferably eliminates reclassification of events that were already classified with high enough confidence 204, but also improves the detection of signatures since this improves the signal to noise ratio. Hard inclusion and hard subtraction are filtering that is preferably based on hard coded class identifications. Soft subtraction is preferably based on Bayesian confidence 204 of classifications provided by previously implemented rules. Normally, soft subtraction is sufficient for most applications. Hard inclusion and hard subtraction are available for advanced customization by the user.

Thus, if the previous rules 20 classified events on the wafer with a sufficiently high confidence 204, these events are preferably excluded from analysis by subsequent rules 20 with the local filtering 206 provided by the subsequent rules 20. This reduces interference of multiple classifications and thereby improves detection. However, only events whose prior classification has a high enough confidence 204 are disregarded. In traditional approaches, any classified event is disregarded for subsequent classification. This method increases accurate detection by subsequent rules 20 and rejects inaccurate classification by prior rules 20. This also reduces sensitivity to the exact sequence of plug in rules 20. Further, since classified events with high enough confidence 204 are disregarded, there tend to be fewer events for consideration by subsequent rules 20, thus improving classification speed.

Post Processing

After the spatial signature analysis is completed by each of the plug in rules 20, or the plug in 20 is skipped as the case may be, each event is preferably assigned only one class identification and one signature identification. Each plug in rule 20 assigns a class identification and signature identification to each event. The post processor 22 arbitrates the final assignment of signature and class identifications based on the effective confidence of the classification of that event as part of a signature belonging to a particular class.

This tends to produce less classification bias. In traditional approaches, the final class identifications and signature identifications depend on the exact sequence of a limited library of classification rules. The first rule to classify always won, regardless of whether or not it was an inaccurate classification. In the system described herein, final signature and class identifications are assigned based on the effective confidence 204 of classification of each event by the post processor 22.

Common Parameter Categories

Parameters are preferably grouped into three categories, being clustering, classification, and filtering. Clustering parameters are used for segmentation, classification parameters are the rules that define a class of interest, and filtering parameters are parameters for local fitters 206 in each plug in rule 20. Preferably, a user only adjusts the clustering parameters. Because these parameter categories have an intuitive meaning, they tend to be very user friendly. Once set, classification and filtering parameters are preferably hidden from the graphical user interface and are available only to advanced users.

Feature Based Plug In

The system described herein allows the possibility of a new spatial signature analysis plug in 20 to be feature based. Thus, the advantages of feature based classification may be obtained by using a plug in rule 20 that is feature based. Performance is preferably improved by combining the advantages of rule based and feature based classifications.

Version Baseline Shift Control

Prior art analysis applications have only made available one version of a given analysis capability at a time. Furthermore, evolution of an analysis capability required a new software release which offered no provision for customers to maintain their baseline on their current device data or technology data The present invention solves these three problems, such as with the compatibility module 14. There are preferably three ways in which a user may configure the system in regard to different versions of the plug in rule modules 20: they want to run only a particular version of the component; they want to run the latest version that has no baseline shift with respect to a prior reference version; and they want to run the latest version irrespective of baseline shift. The user may specify the desired configuration such as through a flag for compatibility along with a reference version of the component. This flag can take, for example, three different values, such as e_ThisVersion, e_NoBaseLineShift and e_BaseLineShiftOK.

E_This Version

This configuration is typically used to strictly specify the use of a particular version of a component, and does not look any further for compatibility. It is desirable when the user is not willing to switch to any advancement in a particular component, or the user is interested in characterizing a particular version of a component With this configuration, the user has strong control over which version of a component is being executed, and the user may test and characterize a particular component while a different version is being used by the same system at the same time.

E_Nobaselineshift

This configuration may be used when the user desires to pick the best version that is installed and licensed, without any baseline shift from prior or reference versions of the plug in rule 20. With this configuration, the user is typically willing to accept new advancements in a component, provided the final outcome is the same as before. As long as the best version produces identical results, the user does not care much about the actual version being used. Thus, as long as the user is comfortable with the results of a reference version, the user does not have to worry about the actual version being used, since the best version does not introduce any baseline shift. The user gets the advantages of the newer version at ease. Further, the user may test and characterize the best component, even without knowing the actual version of the component, without introducing any baseline shift, while a particular version of the same component is being used by the same system at the same time.

E_Baselineshiftok

This configuration may be used when the user desires to pick the best version of the component, such as a plug in 20, that is installed and licensed, and a baseline shift is acceptable. Thus, the user is willing to accept any new advancement in a component, as long as the best version is more accurate or faster. The user does not care much about the actual version being used. This may be a user with a stronger interest in performance than in any baseline shifts that may occur in the statistical process control charts, and who thus takes advantage of more accurate or faster analysis by the best version. In this manner, the user may test and characterize the best component, even without knowing the actual version of the component, while a particular version of the same component is being used by the same system at the same time.

This is preferably achieved by each component, such as a plug in rule module 20, advertising a compatibility table.

Each component preferably contains the information that is necessary for a main compatibility algorithm to select the appropriate component version from the recipe. For example, each component preferably provides a list of compatible components, i.e. a list of component versions that are compatible with this version. For each compatible version in the list, the component preferably provides a Boolean flag indicating whether the listed component introduces baseline shift or not. In addition, component versions are preferably ordered by preference. This gives an ordered list of versions. In practice, components may be ordered based on the release data. In other words, the latest compatible version becomes the best compatible version. Additionally, the user preferably supplies a reference version and compatibility. When the user wants to execute a particular component, a reference version can be passed along with the intended compatibility flag.

An algorithm to select the best compatible component is next described. Let A be a versioned component that performs some kind of analysis. If Compatibility=e_ThisVersion, then check if component A is installed and licensed. If so, return A, else report that the requested component is not available. If Compatibility=e_NoBaseLineShift, then search for all components that list A in their compatibility table as a component without any baseline shift. Among the found components, select only those that are installed and properly licensed. Repeat this procedure for all components that are installed and properly licensed. At the end of this process, there is a set of compatible components with no baseline shift. Out of this set, select the component with the highest order, as described above. If this set is empty, follow the steps as given when Compatibility=e_ThisVersion.

If Compatibility=e_BaseLineShiftOK, then search for all components that list A in their compatibility table without considering their baseline shift information. Among the found components, select only those that are installed and properly licensed. Repeat this procedure for all components that are installed and properly licensed. At the end of this process, there is a set of compatible components. Out of this set, select the component with the highest order as described above. If this set is empty, again follow the steps as given when Compatibility=e_ThisVersion.

This algorithm has many new features and benefits. For example, the compatibility table of previously released versions need not be updated when a newer version is released. In addition, multiple versions of the same plug in rule 20 may be installed and users can easily choose which one to run based on criteria such as device or technology. These versions may be baseline-shifted or not. Further, users can install a newer version of a plug in rule 20 and run it without changing the logic in which the original component was invoked, as long as an appropriate compatibility flag is used.

If the user invokes the versioned plug in rule 20 by means of the recipe, then the user gets more benefits, because the user can also install a new component and run it without changing their recipes, as long as the appropriate compatibility flag is set in the recipe. Users can additionally run newly created recipes for a device for which no baseline exists, hence creating a new baseline using the latest available component. These same users can maintain existing baselines for existing devices by running existing recipes with the appropriate compatibility flag.

Bayesian Confidence

Event based weight is the confidence of the membership of an event to the signature that it is part of. It can be different for each event. A weight of 1 implies that the event is most likely to be a member of the signature it was classified to be part of. A weight of 0 implies that the event is probably not part of any signature. One approach to determine event based weights is to use the local density near the event with respect to the average density of the signature it belongs to. Event based weight of an event is the probability that it is a member of signature s, given that it is classified to be part of signature s.

Signature based weight is the confidence of the membership of a detected signature to the class that it was classified. These are preferably the same for all events that belong to the same signature. However, events from different signatures can have different signature based weights. The following example illustrates one way of to calculate signature based weights.

Let $a_i$ and $b_j$ be finite numbers of positive fractions such that their sum equals unity. Define $f_i^u$ as a function that depends directly on the user (hence the superscript u) parameter for classification. For example, $length_{min}$ may be a user parameter for classification of a scratch. Let $f_j^p$ be a function that depends on the intrinsic properties (hence the superscript p) of the signature, especially those not covered directly by the user parameter. Both $f_i^u$ and $f_j^p$ lie in the unit interval [0, 1].

The signature based weight for a given signature may be evaluated as:

$$w = \Sigma_i a_i f_i^u + \Sigma_j b_j f_j^p$$

This method gives a general approach to calculate signature based weights for an arbitrary signature. A weight of 1 implies that the signature found most likely belongs to the class/signature assigned to it. A weight close to 0 implies that the signature found most likely does not belong to the class assigned to it. Thus, signature based weight of a signature is the probability that it is a member of class c, given that it is classified to be of class c.

These are preferably the same for all events that belong to the same class. However, events from different classes can preferably have different class based weights as assigned by the user. Higher weight is assigned to the class that the user gives importance to or in which the user has more confidence on the classification result for that class. Class based weight of a class may be treated as a prior probability of a particular class.

Post Processing Based on Bayesian Confidence

Let e be an event whose event, signature and class based weights are $p_j$, $w_j$ and $U_j$ respectively. Where, j=1, 2, . . . , n correspond to rules $r_1$, $r_2$, and $r_n$ respectively. The rules are numbered according to the order of execution. Note that the same rule may appear more than once. Let c and s be the unique class and signature identifications to be assigned to event e, respectively. Let $c_j$ and $s_j$ be the class and signature identifications assigned to the event by rule $r_j$, respectively.

The post processor uses the following decision rule:

$C=C_j$, for j such that the product $p_j^* w_j^* u_j$ is maximum and $S=S_j$, for j such that the product $p_j^* w_j^* u_j$ is maximum.

If there are more than one j for which the product $p_j^* w_j^* u_j$ is maximized, then the least j is chosen. This means that in the event of a tie, the earlier rules in the sequence preferably take priority over the later rules. However, this could be altered.

If there are more than one j for which the product $p_j*w_j*u_j$ is maximized, then the least j is chosen. This means that in the event of a tie, the earlier rules in the sequence take priority over the later rules. Again, this could be selectively altered, as desired.

Common Clustering Parameters

Each plug in 20 preferably has as clustering parameters only contrast level 206 and interference level 208. Some of the plug ins 20 may have neither or only one of these two parameters. Contrast level 206 (similarly clustering level) indicates the same thing for all plug ins 20. This makes it easier for the user to set parameters because there can be at most only two clustering parameters for each plug in 20, and they have the same meaning. This makes it easy for the user to create a recipe.

Figure 1A:
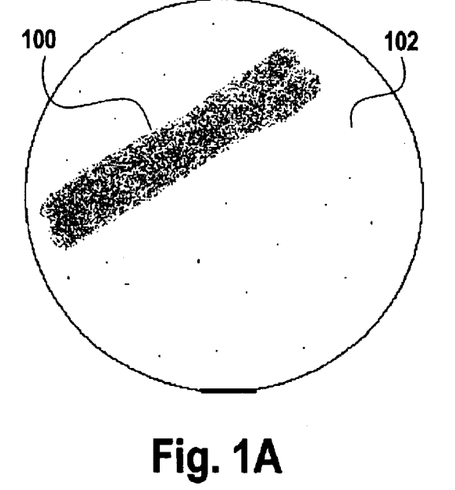
FIG. 1A is a representation of a cluster having a high contrast relative to the background.
Figure 1B:
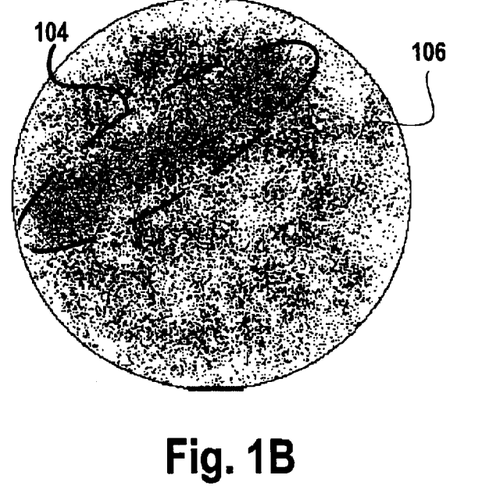
FIG. 1B is a representation of a cluster having a low contrast relative to the background.

The contrast of a cluster describes the relative density of the cluster with respect to its background. A large absolute difference means that the contrast is high and vice versa. FIGS. 1A and 1B illustrate two distributions with the same cluster but with different backgrounds. The cluster 100 in FIG. 1A has a relatively high contrast against the background 102, while the cluster 104 in FIG. 1B has a relatively low contrast against the background 106. Thus, the distributions in FIGS. 1A and 1B both have the same signature, but because of the difference in contrast the signature depicted in FIG. 1B may be more difficult to detect.

Figure 2A:
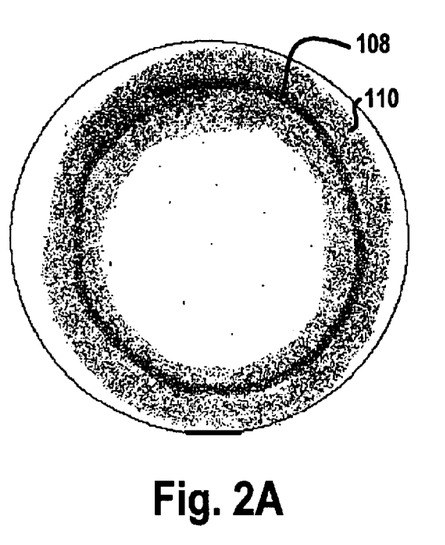
FIG. 2A is a representation of a cluster interpreted with a high interference level.
Figure 2B:
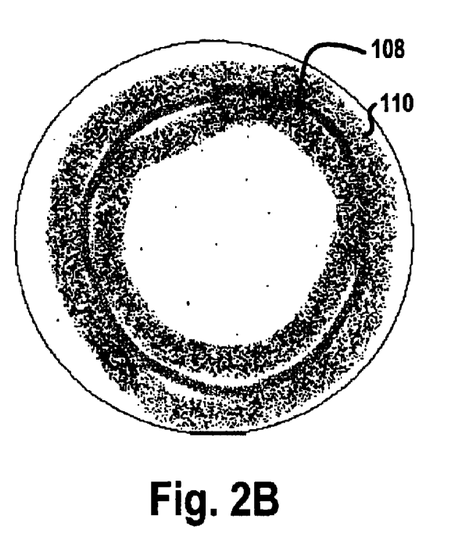
FIG. 2B is a representation of a cluster interpreted with a low interference level.

FIGS. 2A and 2B illustrate the effect of selecting different contrast levels 206 for the same distribution. The contrast level 206 can adjust the size of the signature, since there is a variation in contrast across the cluster. Both FIGS. 2A and 2B are assumed to have exactly the same distribution of events, even though they do not visually appear so. A relatively lower contrast level 206 is selected in FIG. 2A and a relatively higher contrast level 206 is selected in FIG. 2B. Thus, with the selection of a relatively high contrast level 206 as depicted in FIG. 2A, the signature is more readily identifiable as the cluster 108 against the background 110. However, with the selection of a relatively low contrast level 206 as depicted in FIG. 2B, the signature is more readily identifiable as a unified cluster 108 plus 110.

Figure 3:
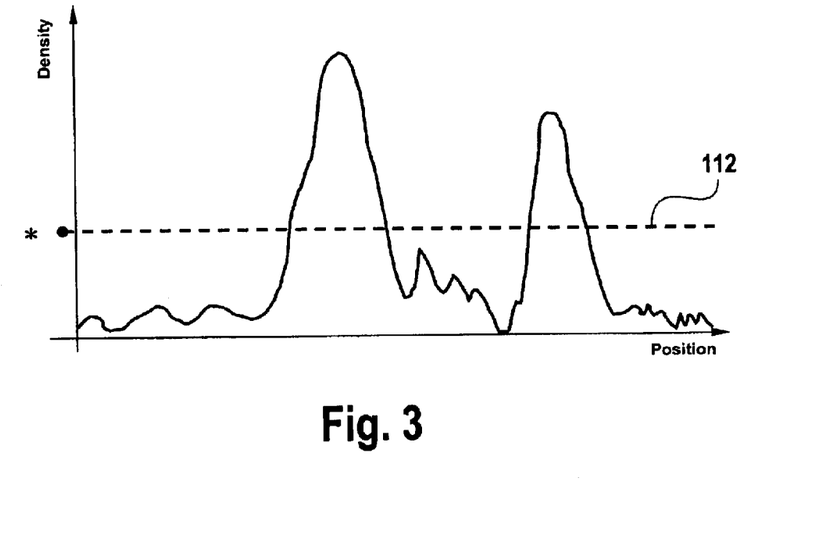
FIG. 3 is a graphical representation of resolving clusters from the background using a contrast level.

FIG. 3 depicts a simple approach to use contrast level 206 to control the clustering algorithm using a one dimensional example where the local density of events is plotted against position. The broken line 112 sets the contrast level 206. All events with a density above this contrast level 112 are considered for clustering (segmentation). The proximate events are clustered together.

Figure 4A:
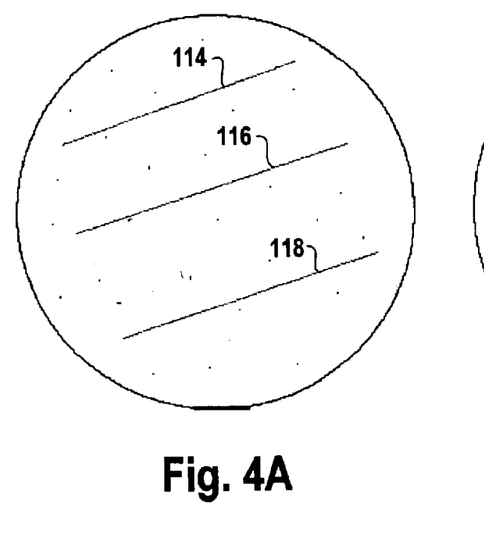
FIG. 4A is a representation of scratches having a lower interference.
Figure 4B:
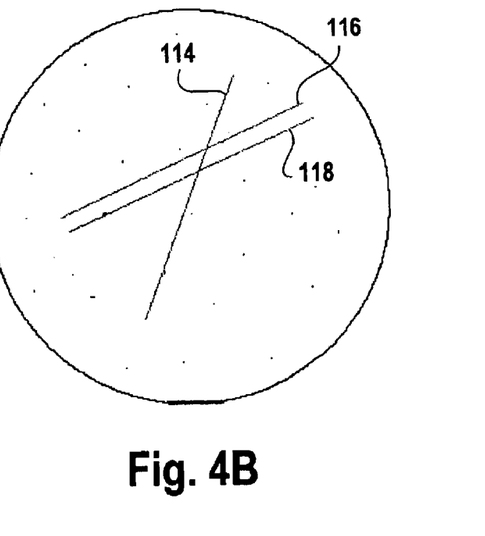
FIG. 4B is a representation of scratches having a higher interference.

The interference level 208 of clusters in a distribution is a level of interaction between clusters. The interference level 208 of clusters in a distribution is affected by the mutual separation between clusters. This can be used to used to merge or split clusters. The example in FIGS. 4A and 4B illustrates the interference level 208 in two distinct distributions. FIG. 4A has low interference because the scratches 114–118 do not interfere severely with each other. However, in FIG. 4B the scratches 114–118 interfere with each other, which tends to cause poor detection of the scratches. Thus, the interference level in FIG. 4B is higher than the interference level in FIG. 4A.

Figure 5:
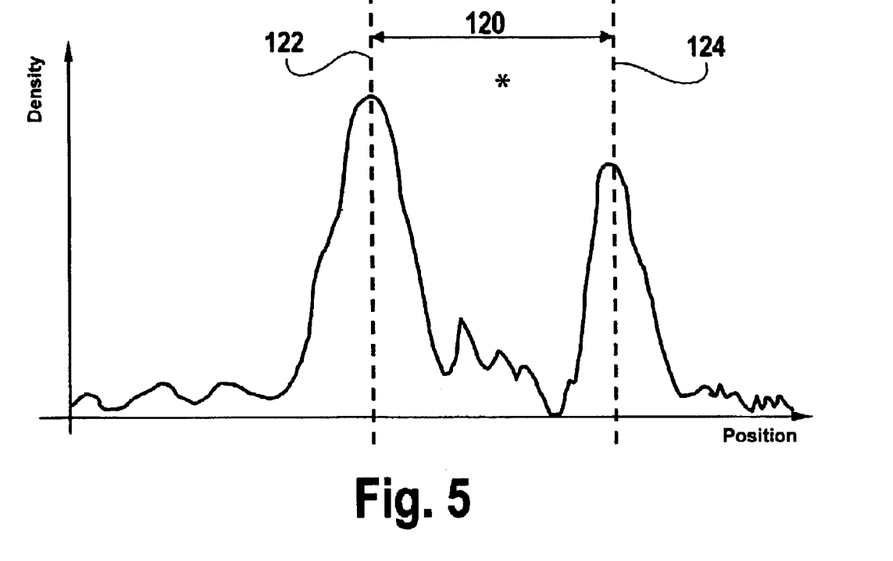
FIG. 5 is a graphical representation of resolving clusters one from another using an interference level.

FIG. 5 depicts a simple approach to use interference level 208 to control merging of clusters, using a one dimensional example in which the local density of events is plotted against position. The interference level 208 determines the distance 120 between the two broken lines 122 and 124. Effectively, clusters within the mutual distance set by interference level 208 are considered for merging together. In other words, if the distance 120 between two events 122 and 124 is less than the value set for the interference level 208, then the two events 122 and 124 are merged into a single event. Similarly, if the distance 120 between two events 122 and 124 is greater than the value set for the interference level 208, then the two events 122 and 124 are identified as different events.

The interference level 208 tends to be more meaningful if the contrast level is also known or supplied. The contrast level controls the clustering (segmentation) algorithm applied to the events by either resolving or blending the edge of a cluster against the background. Whereas, interference level controls the clustering (segmentation) algorithm applied to clusters by either uniting or separating clusters one from another.

Thus, the spatial signature analysis system described herein exhibits at least the following six novel attributes: plug in rules to a flexible framework that is driven by means of a recipe; class based, signature based, and event based weights and confidences with a probabilistic interpretation; local filtering based on the probabilistic confidences assigned by previous classification rules; post processing based on the probabilistic confidences assigned by all classification rules; uniform definition of parameter categories and common clustering parameters (contrast and interference levels) that enables easier usage; ability to have a user defined rule along with the other basic classification rules; and the ability to deploy plug ins that take into account non spatial attributes such as class codes.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A system for determining an assigned classification for a set of physical events on a substrate, the system comprising:

sensors for sensing the physical events on the substrate and for producing event data, a plug in rule module manager for receiving and managing any number of plug in rule modules, at least one plug in rule module, each plug in rule module having, an input for receiving the event data, the input also for receiving confidence values from preceding plug in rule modules, a local filter for analyzing the received confidence values from the preceding plug in rule modules and selectively by passing the plug in rule module based at least in part upon the received confidence values from the preceding plug in rule modules, an analyzer for analyzing the event data in view of a given classification associated with the plug in rule module, and for assigning a confidence value based at least in part upon how well the event data fits the given classification, and
an output for providing the confidence value to subsequent plug in rule modules, and
a post processor for receiving the confidence values provided by the at least one plug in rule module, and for making a final selection of the assigned classification to be associated with the set of physical events from the given classifications based at least in part upon a comparison of the confidence values produced by all plug in rule modules.

2. The system of claim 1, wherein the input of the plug in rule module is further adapted for receiving a user specified weight value, where the weight value selectively increases and decreases the confidence value produced by the plug in rule module.

3. The system of claim 1, wherein the input of the plug in rule module is further adapted for receiving a user specified contrast value, where the contrast value selectively increases and decreases a resolution of the event data from other data collected from the substrate.

4. The system of claim 1, wherein the input of the plug in rule module is further adapted for receiving a user specified interference value, where the interference value selectively increases and decreases a grouping of the event data.

5. The system of claim 1, further comprising a common data storage for receiving the event data and for providing the event data to the at least one plug in rule module.

6. The system of claim 1, further comprising a compatibility module for managing multiple versions of a given plug in rule module within the system.

7. The system of claim 6, wherein the compatibility module further comprises a user selectable setting for always using a reference version of the given plug in rule module.

8. The system of claim 6, wherein the compatibility module further comprises a user selectable setting for always using a newest version of the given plug in rule module, and for adapting output from the newest version of the given plug in rule module to have a same baseline with respect to a reference version of the given plug in rule module.

9. The system of claim 6, wherein the compatibility module further comprises a user selectable setting for always using a newest version of the given plug in rule module, regardless of whether output from the newest version of the given plug in rule module has a same baseline as a reference version of the given plug in rule module.

10. A system for determining an assigned classification for a set of physical events on a substrate, the system comprising:
sensors for sensing the physical events on the substrate and for producing event data,
a plug in rule module manager for receiving and managing any number of plug in rule modules,
at least one plug in rule module, each plug in rule module having,
an input for receiving the event data, the input also for receiving confidence values from preceding plug in rule modules,
a local filter for analyzing the received confidence values from the preceding plug in rule modules and selectively by passing the plug in rule module based at least in part upon the received confidence values from the preceding plug in rule modules,
an analyzer for analyzing the event data in view of a given classification associated with the plug in rule module, and for assigning a confidence value based at least in part upon how well the event data fits the given classification, and
an output for providing the confidence value to subsequent plug in rule modules,
a compatibility module for managing multiple versions of a given plug in rule module within the system, and
a post processor for receiving the confidence values provided by the at least one plug in rule module, and for making a final selection of the assigned classification to be associated with the set of physical events from the given classifications based at least in part upon a comparison of the confidence values produced by all plug in rule modules.

11. The system of claim 10, wherein the input of the plug in rule module is further adapted for receiving a user specified weight value, where the weight value selectively increases and decreases the confidence value produced by the plug in rule module.

12. The system of claim 10, wherein the input of the plug in rule module is further adapted for receiving a user specified contrast value, where the contrast value selectively increases and decreases a resolution of the event data from other data collected from the substrate.

13. The system of claim 10, wherein the input of the plug in rule module is further adapted for receiving a user specified interference value, where the interference value selectively increases and decreases a grouping of the event data.

14. The system of claim 10, further comprising a common data storage for receiving the event data and for providing the event data to the at least one plug in rule module.

15. The system of claim 10, wherein the compatibility module further comprises a user selectable setting for always using a reference version of the given plug in rule module.

16. The system of claim 10, wherein the compatibility module further comprises a user selectable setting for always using a newest version of the given plug in rule module, and for adapting output from the newest version of the given plug in rule module to have a same baseline with respect to a reference version of the given plug in rule module.

17. The system of claim 10, wherein the compatibility module further comprises a user selectable setting for always using a newest version of the given plug in rule module, regardless of whether output from the newest version of the given plug in rule module has a same baseline as a reference version of the given plug in rule module.

18. A system for determining an assigned classification for a set of physical events on a substrate, the system comprising:
sensors for sensing the physical events on the substrate and for producing event data,
a plug in rule module manager for receiving and managing any number of plug in rule modules,
at least one plug in rule module, each plug in rule module having,
an input for receiving,
the event data,
confidence values from preceding plug in rule modules,
a user specified weight value, where the weight value selectively increases and decreases the confidence value produced by the plug in rule module,
a user specified contrast value, where the contrast value selectively increases and decreases a resolution of the event data from other data collected from the substrate, and a user specified interference value, where the interference value selectively increases and decreases a grouping of the event data, a local filter for analyzing the received confidence values from the preceding plug in rule modules and selectively by passing the plug in rule module based at least in part upon the received confidence values from the preceding plug in rule modules, an analyzer for analyzing the event data in view of a given classification associated with the plug in rule module, and for assigning a confidence value based at least in part upon how well the event data fits the given classification, and an output for providing the confidence value to subsequent plug in rule modules, a compatibility module for managing multiple versions of a given plug in rule module within the system, and a post processor for receiving the confidence values provided by the at least one plug in rule module, and for making a final selection of the assigned classification to be associated with the set of physical events from the given classifications based at least in part upon a comparison of the confidence values produced by all plug in rule modules.

19. The system of claim 18, wherein the compatibility module further comprises a user selectable setting for always using a newest version of the given plug in rule module, and for adapting output from the newest version of the given plug in rule module to have a same baseline with respect to a reference version of the given plug in rule module.

20. The system of claim 18, wherein the compatibility module further comprises a user selectable setting for always using a newest version of the given plug in rule module, regardless of whether output from the newest version of the given plug in rule module has a same baseline as a reference version of the given plug in rule module.

* * * * *